(12) United States Patent
Greenberg et al.

(10) Patent No.: US 8,858,074 B2
(45) Date of Patent: Oct. 14, 2014

(54) DAMPED EGT PROBE

(75) Inventors: Michael D. Greenberg, Bloomfield, CT (US); Ryan Spence, Windsor Locks, CT (US); William T. Kelly, Windsor Locks, CT (US); Joseph DeLorme, Windsor Locks, CT (US); Bobby J. McLarty, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 168 days.

(21) Appl. No.: 13/550,174

(22) Filed: Jul. 16, 2012

(65) Prior Publication Data

US 2014/0016670 A1    Jan. 16, 2014

(51) Int. Cl.
  *G01K 7/00*  (2006.01)
  *G01K 1/00*  (2006.01)
  *G01F 1/58*  (2006.01)

(52) U.S. Cl.
  USPC ......... 374/179; 374/208; 374/144; 73/861.66

(58) Field of Classification Search
  CPC ....................................................... G01K 1/14
  USPC .................. 374/132, 179, 162, 183; 73/866.5
  See application file for complete search history.

(56) References Cited

U.S. PATENT DOCUMENTS

| | | | |
|---|---|---|---|
| 3,990,308 A | 11/1976 | McCormick et al. | |
| 4,131,756 A | 12/1978 | Smith | |
| 4,132,114 A * | 1/1979 | Shah et al. | 374/179 |
| 4,204,186 A | 5/1980 | Parisi et al. | |
| 4,765,751 A * | 8/1988 | Pannone et al. | 374/143 |
| 4,968,151 A * | 11/1990 | Thomson | 374/135 |
| 5,106,203 A | 4/1992 | Napoli et al. | |
| 5,421,652 A * | 6/1995 | Kast et al. | 374/208 |
| 5,975,842 A * | 11/1999 | Jensen et al. | 415/118 |
| 6,592,253 B2 | 7/2003 | Nyffenegger et al. | |
| 8,087,824 B2 | 1/2012 | Bingham | |
| 2007/0147470 A1 | 6/2007 | Liu et al. | |
| 2010/0257846 A1 | 10/2010 | Weber | |

FOREIGN PATENT DOCUMENTS

| | | |
|---|---|---|
| EP | 1556598 B1 | 7/2005 |
| JP | 58103627 A | 6/1983 |
| JP | 04109131 A | 4/1992 |

OTHER PUBLICATIONS

International Search Report and Written Opinion dated Oct. 15, 2013 for of PCT Application No. PCT/US2013/050617, nine pages.

* cited by examiner

*Primary Examiner* — Lisa Caputo
*Assistant Examiner* — Nasir U Ahmed
(74) *Attorney, Agent, or Firm* — Kinney & Lange, P.A.

(57) ABSTRACT

A temperature probe includes a flange, a support structure, thermocouple wires, and guide plates. The flange has a midline. The support structure is attached to the midline and extends away from the flange. The thermocouple wires extend along the support structure, and terminate in a set of outer sensing tips and a set of inner sensing tips. The guide plates secure the thermocouple wires to the support structure. The guide plates are offset laterally from the midline of the flange.

19 Claims, 6 Drawing Sheets

DAMPED EGT PROBE

BACKGROUND

The present disclosure relates generally to gas turbine engines, and more specifically to temperature sensing probes for use in gas turbine engines.

Exhaust gas temperature (EGT) can be used to measure performance and/or indicate the rate of deterioration of a gas turbine engine. A plurality of temperature sensing probes is usually employed to measure EGT and calculate an average EGT. Average EGT is then used to control and/or monitor operational characteristics of the engine.

Existing EGT temperature sensing probes are known to fail in range or completely. In range failures are problematic in that one inaccurate probe reading can alter the average EGT. Complete failure by a probe causes its removal from the average, which can also bias the average EGT depending on the failed probe's location relative to the combustor. Inaccurate EGT readings result in inaccurate EGT averages, which cause loss of performance, emissions misses, running hot, and even engine shutdown.

SUMMARY

A temperature probe includes a flange, a support structure, thermocouple wires, and guide plates. The flange has a midline. The support structure is attached to the midline and extends away from the flange. The thermocouple wires extend along the support structure, and terminate in a set of outer sensing tips and a set of inner sensing tips. The guide plates secure the thermocouple wires to the support structure. The guide plates are offset laterally from the midline of the flange.

A temperature sensing system includes a housing and a probe. The housing includes a flange and an elongated body extending from the flange. The elongated body has walls defining a cavity. The probe includes a flange, a support structure extending from the flange, thermocouple wires extending along the support structure, and guide plates securing the thermocouple wires to the support structure. The flange of the housing is aligned with the flange of the probe such that the support structure, thermocouple wires, and guide plates extend into cavity of the elongated body. At least one of the guide plates contacts at least one of the walls to damp the probe.

A method includes bending temperature sensing wires, support structure, and guide plates relative to a mounting flange to form a spring-loaded probe, and inserting the spring-loaded probe into a housing such that the probe is mechanically damped by contact with the housing.

DETAILED DESCRIPTION

Figure 1:
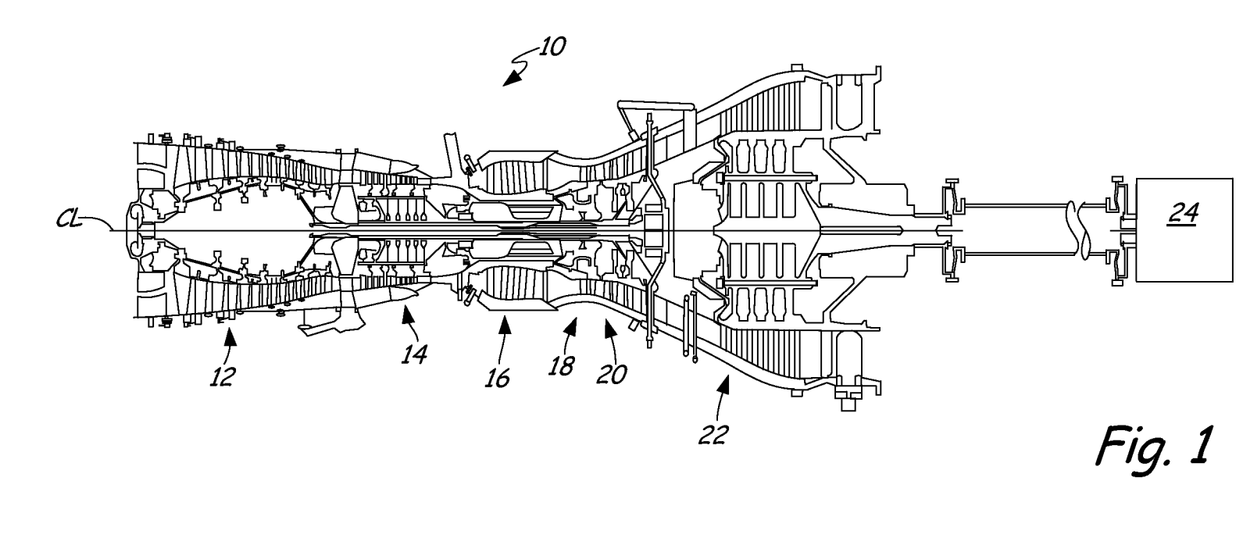
FIG. 1 is a cross section of an industrial gas turbine engine.

FIG. 1 is a cross section of industrial gas turbine engine 10, which is circumferentially disposed about a central, longitudinal axis or axial centerline CL. Gas turbine engine 10 includes in flow series order from front to rear, low pressure compressor 12, high pressure compressor 14, combustor 16, high pressure turbine 18, and low pressure turbine 20. Power turbine 22 is attached to the rear of low pressure turbine and is connected to electrical generator 24.

As known in the art of gas turbines, incoming ambient air is serially pressurized by low pressure compressor 12 and high pressure compressor 14. The pressurized air is sent to combustor 16, where it mixes with fuel and is ignited. Once burned, the resulting combustion products expand serially through high pressure turbine 18, low pressure turbine 20, and power turbine 22 thereby producing usable work. High pressure turbine 18 and low pressure turbine 20 drive high pressure compressor 14 and low pressure compressor 12 through high and low rotor shafts. Power turbine 22 powers, for example, electrical generator 24. The present application also applies to aero engines, and engines with more or fewer sections than illustrated.

Figure 2:
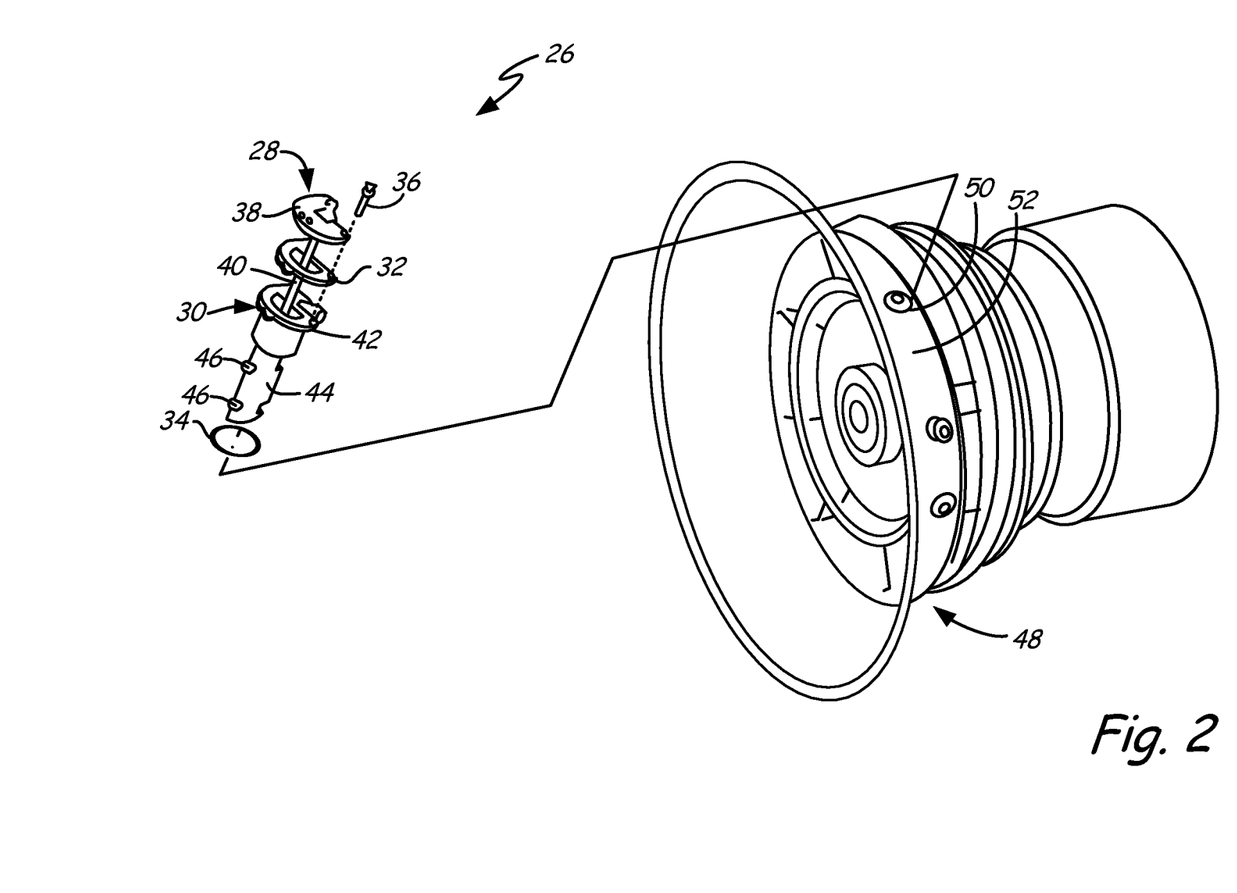
FIG. 2 is an exploded perspective view of a temperature sensing system for the gas turbine engine of FIG. 1.

FIG. 2 is an exploded perspective view of temperature sensing system 26 for gas turbine engine 10 of FIG. 1. Temperature sensing system 26 includes probe 28, housing 30, gasket 32, seal ring 34, and studs 36. Probe 28 has flange 38 and thermocouple wires 40. Housing 30 has flange 42 and body 44 with openings 46. Probe 28 is disposed in housing 30, which is attached to power turbine inlet case 48. More specifically, housing 30 is inserted into hole 50 on front flange 52 of power turbine inlet case 48.

Temperature sensing system 26 is primarily composed of two components: probe 28 and housing 30. Probe 28 has flange 38 at a radially outer end and thermocouple wires 40 extending from flange 38 to a radially inner end. Housing 30 has flange 42 at a radially outer end and body 44 extending from flange 42 to a radially inner end. Body 44 is elongated, aerodynamic in shape, and forms a cavity for receiving probe 38. Flange 42 at the radially outer end of housing 30 is open for receiving thermocouple wires 40, while the radially inner end of body 44 is closed. Two openings 46 are located on an upstream side of body 44. Flange 38 of probe 28 is aligned to be coaxial with flange 42 of housing 30, such that thermocouple wires 40 are received into the cavity of body 44. Gasket 32 is positioned between flange 38 of probe 28 and flange 42 of housing 30 and includes a central aperture for thermocouple wires 40. The central aperture of gasket 32 is aligned coaxially with the opening of flange 42 and cavity of body 44. One or more studs 36 secure flange 38 of probe 28, gasket 32, and flange 42 of housing 30 to one another. Seal ring 34 is positioned at the radially inner end of body 44 and is configured to slide over the radially inner end of body 44 and settle at a neck portion near flange 42.

Housing 30, containing thermocouple wires 40 of probe 28, is configured for mounting to power turbine inlet case 48. More specifically, body 44 of housing 30 is inserted into hole 50 on flange 52 of power turbine inlet case 48. Body 44 extends through hole 50, such that seal ring 34 is trapped between flange 42 of probe 28 and flange 52 surrounding hole 50 of power turbine inlet case 48. Flange 42 of housing 30 is secured to flange 52 of turbine inlet case 48 by any suitable fastening means (e.g. bolts). So positioned, housing 30 containing probe 28 extends radially inward from power turbine inlet case 48 toward centerline CL of engine 10. In the depicted embodiment, nine combinations of housing 30 and probe 28 can extend through nine holes 50 located circumferentially and spaced about flange 52 of power turbine inlet case 48, although more or less housing 30 and probe 28 combinations are possible. In one embodiment, holes 50 can be spaced symmetrically about flange 52. In other embodiments, holes 50 can be spaced asymmetrically about flange 52. In other embodiments, holes 50 can be positioned in gas turbine engine 12 in locations other than in flange 52.

In applications with more than one probe 28, the various probes 28 can be positioned upstream of a plurality of combustor cans (not shown) of combustor 16 so as to combine to measure a combustor average temperature. Loss of even a single probe 28 caused by vibration can cause an undesirable distortion in the measured combustor average temperature. Thus, it can be beneficial to have probes that are resistant to damage caused by vibration.

Power turbine inlet case 48 is the upstream most portion of power turbine 22 (see FIG. 1). Accordingly, flange 52 of power turbine inlet case 48 is secured to the downstream end of low pressure turbine 20. Hot gas exiting low pressure turbine 20 will enter power turbine 22 by passing through flange 52 of power turbine inlet case 48. Thermocouple wires 40 of probe 28 are exposed to the hot gas path by openings 46 in body 44 and sense the temperature of working air flowing through power turbine inlet case 48.

Figure 3:
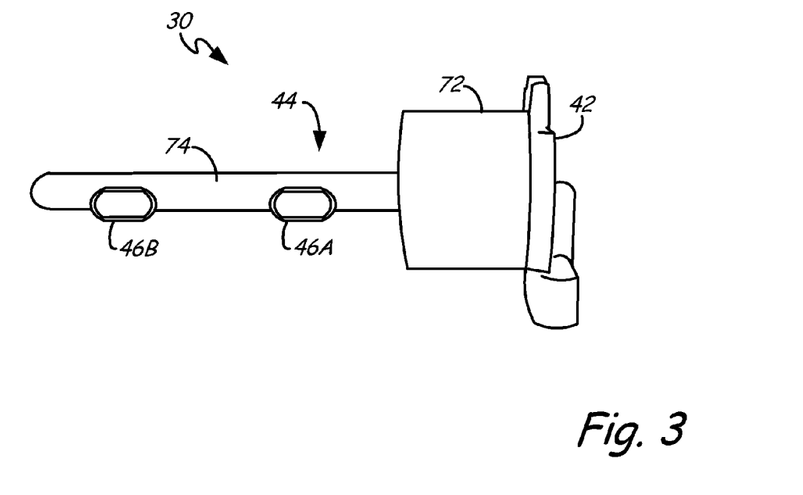
FIG. 3 is a perspective view of probe and housing from the temperature sensing system of FIG. 2 dissembled.

FIG. 3 is a perspective view of probe 28 and housing 30 from the temperature sensing system 26 of FIG. 2 prior to assembly. Probe 28 includes flange 38, thermocouple wires 40 (including first thermocouple wire 56A having first sensing tip 58A, second thermocouple wire 56B having second sensing tip 58B, third thermocouple wire 60A having third sensing tip 62A, and fourth thermocouple wire 60B having fourth sensing tip 62B), backbone rod(s) 64, guide plates 66A-66D (including first guide plate 66A, second guide plate 66B, third guide plate 66C, and fourth guide plate 66D), electrical housing 68, and studs 70. Housing 30 includes flange 42 and body 44 (including neck 72 and arm 74) having openings 46A and 46B. As shown above with reference to FIG. 2, probe 28 is inserted into housing 30 and attached to power turbine inlet case 48 to sense gas path temperatures.

Flange 38 of probe 28 has three holes 54 extending therethrough for receiving studs 36 as shown above with respect to FIG. 2, although more or less holes 54 and other fastening means are also possible. Thermocouple wires 40 extend from a midline of flange 38 and are divisible into a first set of sensing wires (comprising first thermocouple wire 56A terminating in first sensing tip 58A and second thermocouple wire 56B terminating in second sensing tip 58B) and a second set of sensing wires (comprising third thermocouple wire 60A terminating in third sensing tip 62A and fourth thermocouple wire 60B terminating in fourth sensing tip 62B). Thermocouple wires 40 are attached to elongated backbone rods 64, which also extend from a midline of flange 38, by a series of guide plates 66. Backbone rods 64 are a support structure to support guide plates 66 and thermocouple wires 40. Two backbone rods 64 and four guide plates 66 are shown in the depicted embodiment, although more or less are also possible.

Backbone rods 64 form structural support and rigidity for thermocouple wires 40. Guide plates 66A-66D secure thermocouple wires 40 to backbone rods 64 and are spaced apart along backbone rods 64. Guide plates 66 are substantially ovular (see e.g. first guide plate 66A in FIG. 4) except for the top surfaces of guide plates 66 which can be flat, indented, or otherwise modified. First guide plate 66A is spaced from flange 38. First guide plate 66A includes an aperture through which first thermocouple wire 56A, second thermocouple wire 56B, third thermocouple wire 60A, fourth thermocouple wire 60B and backbone rods 64 extend to be secured to one another. Second guide plate 66B is spaced from first guide plate 66A and includes an aperture though which third thermocouple wire 60A, fourth thermocouple wire 60B backbone rods 64 extend to be secured to one another. First thermocouple wire 56A and second thermocouple wire 56B terminate in first sensing tip 58A and second sensing tip 58B, respectively, which are supported on a flat top surface of second guide plate 66B. First sensing tip 58A and second sensing tip 58B are collectively known as outer sensing tips 58.

Third guide plate 66C is spaced from second guide plate 66B and includes an aperture though which third thermocouple wire 60A, fourth thermocouple wire 60B, and backbone rods 64 extend to be secured to one another. Fourth guide plate 66D is spaced from third guide plate 66C and includes an aperture through which backbone rods 64 extend. Third thermocouple wire 60A and fourth thermocouple wire 60B terminate in third sensing tip 62A and fourth sensing tip 62B, respectively, which are supported on a flat top surface of fourth guide plate 66D. Third sensing tip 62A and fourth sensing tip 62B are collectively known as inner sensing tips 62. Thermocouple wires 40 also extend through flange 38 and into electrical housing 68 to terminate in studs 70.

As shown above with reference to FIG. 2, probe 28 is configured for insertion into housing 30. Housing 30 includes a central cavity extending longitudinally over full length of body 44 for receiving probe 28. More specifically, body 44 of housing 30 includes neck 72 attached to flange 42 and arm 74 extending from neck 72. Neck 72 is enlarged as compared to arm 74, which is elongated, ovular and streamlined. Two openings 46A and 46B are spaced along arm 74 to allow working air to flow over thermocouple wires 40.

Thermocouple wires 40 can be constructed as known in the art, for example by soldering or welding two dissimilar metals such as chromel and alumel. Thermocouple wires 40 are supported longitudinally by backbone rods 64 and constrained laterally by guide plates 66. Each set of thermocouple wires 40 includes side by side thermocouple junctions, which are aligned with openings 46A and 46B on housing 30. First sensing tip 58A and second sensing tip 58B form a first thermocouple junction which is aligned with first opening 46A of housing 30. Similarly, third sensing tip 62A and fourth sensing tip 62B form a second thermocouple junction aligned with second opening 46B of housing 30. When housing 30 is inserted through hole 50 on flange 52 of power turbine inlet case 48 as shown in FIG. 2, the two sets of thermocouple tips are radially spaced apart for sensing the gas path temperature at difference concentric circles away from centerline CL.

Figure 4:
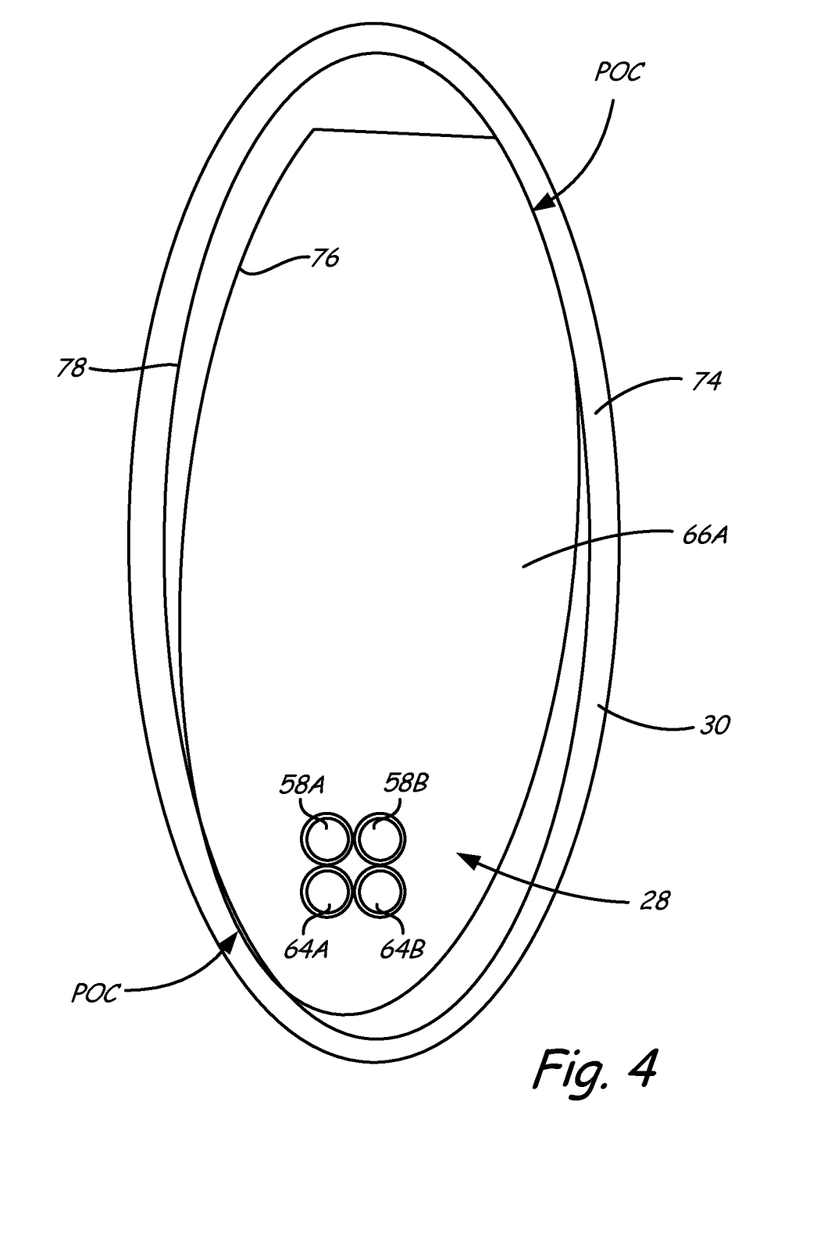
FIG. 4 is a cross section of the probe and housing of FIG. 3 assembled.

FIG. 4 is a cross section of probe 28 and housing 30 of FIG. 3 assembled. Shown in FIG. 4 are first sensing tip 58A, second sensing tip 58B, support rods 64A and 64B, second guide plate 66B having outer surface 76, and arm 74 having inner surface 78. Probe 28 is bent to be preloaded such that one or more points of contact POC are formed between outer surface or circumference 76 of first guide plate 66A and inner surface or internal wall 78 of arm 74. In the illustrated embodiment, probe 28 is twisted relative to housing 30, such that one or more points of contact POC are formed between outer surface or circumference 76 of first guide plate 66A and inner surface or internal wall 78 of arm 74. Two points of contact POC are shown in FIG. 4, which damps vibration of probe 28. In alternative embodiments, probe 28 can be bent in a manner other than by twisting, such as being bent sideways along a length of support rods 64A and 64B.

As discussed above with reference to FIG. 2, probe 28 is inserted into housing 30. Prior to insertion, probe 28 is twisted. The twisting of probe 28 causes thermocouple wires 40, backbone rods 64, and guide plates 66 to be offset from a midline of arm 74. Two points of contact POC are formed between the ovular outer surface 76 of first guide plate 66A and the ovular inner surface 78 of arm 74. The materials forming probe 28 are resilient and will push against and exert force on housing 30. More specifically, outer surface or circumference 76 of first guide plate 66A will exert force against inner surface or internal wall 78 of arm 74 at points of contact POC.

In use, gas flows into openings 46 (such as first opening 46A from FIG. 3) on housing 30 and over thermocouple wire 40 tips (such as first sensing tip 58A and second sensing tip 58B), which measure the temperatures. The high velocity of gas entering housing 30 can cause thermocouple wires 40 to vibrate and tips are known to break off from contact with housing 30 and/or other aerodynamic excitation. The present disclosure proposes points of contact POC between probe 28 and housing 30 to damp vibration of probe 28 and load it against housing 30 to reduce or eliminate high cycle fatigue and breaking of thermocouple wire 40 tips.

Figure 5A:
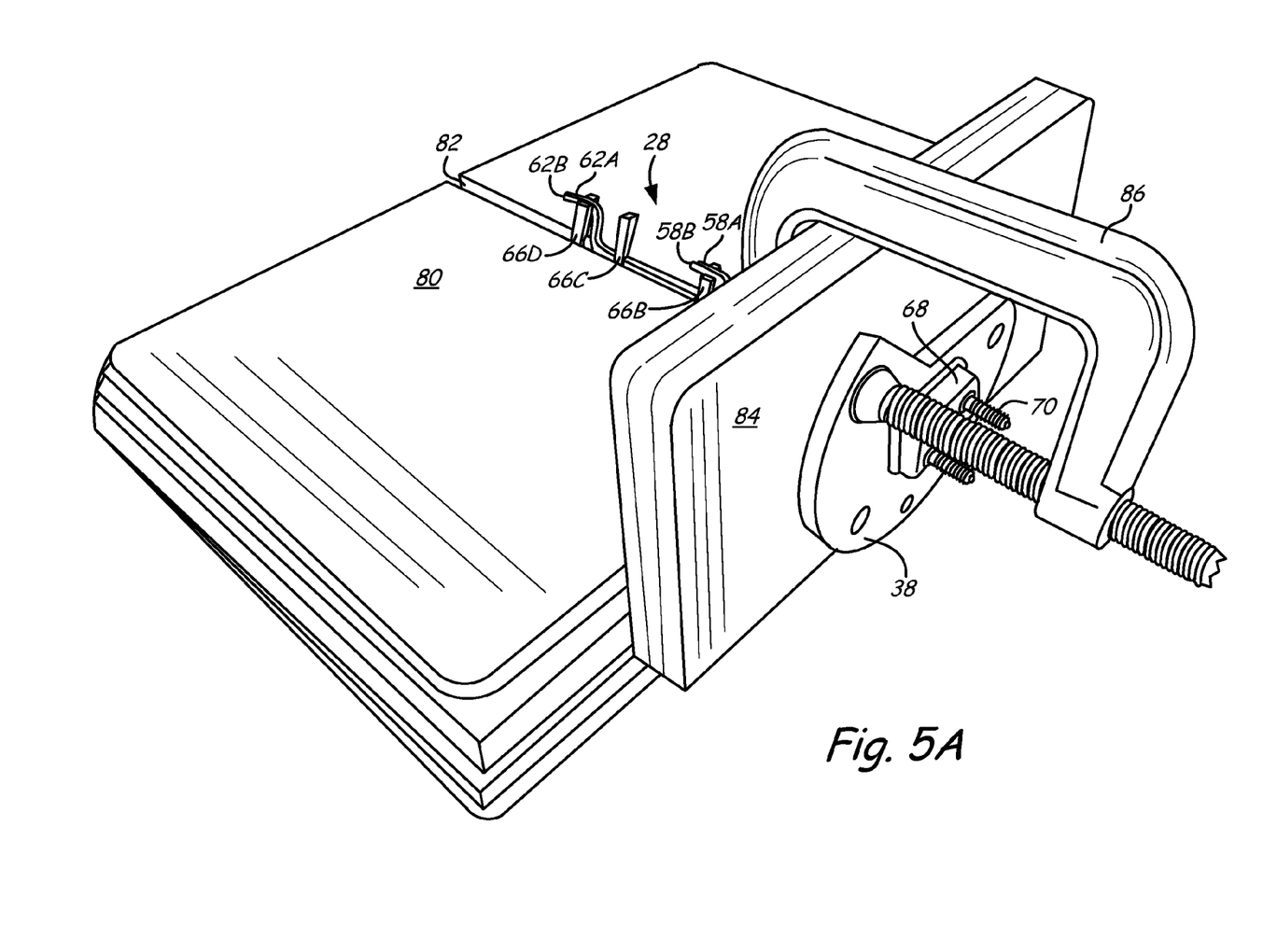
FIG. 5A is a rear perspective view and FIG. 5B is a front perspective view of the probe and tooling for an associated method.
Figure 5B:
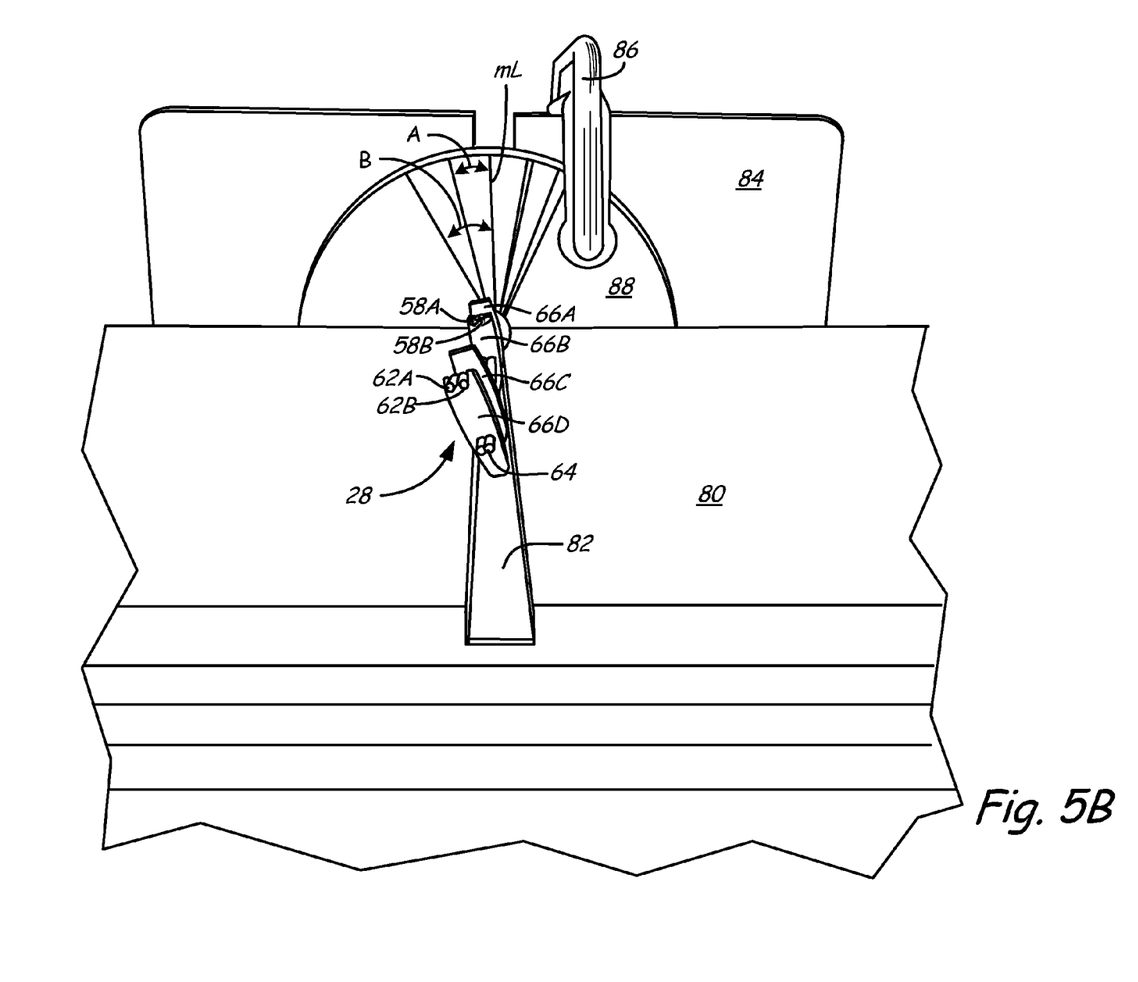

FIG. 5A is a rear perspective view and FIG. 5B is a front perspective view of probe 28 and tooling for imparting a twist into probe 28. Shown in FIGS. 5A-5B are first sensing tip 58A, second sensing tip 58B, third sensing tip 62A, fourth sensing tip 62B, backbone rods 64, first guide plate 66A, second guide plate 66B, third guide plate 66C, fourth guide plate 66D, electrical housing 68, studs 70, horizontal support 80 having channel 82, vertical support 84, clamp 86, and protractor 88. Protractor 88 includes midline ML (or 90 degrees) angle A and angle B. The assembly depicted in FIGS. 5A and 5B allows for a repeatable method of twisting probe 28 prior to insertion into housing 30.

As shown in FIG. 5A, thermocouple wires 40, backbone 64, and guide plates 66 extend longitudinally in channel 82 of horizontal support 80. Flange 38 is secured to a first side of vertical support 84 by clamp 86, while protractor 88 is secured to a second, opposite side of vertical support 84 by clamp 86. Midline ML of protractor 88 is aligned with a midline of flange 38, from which thermocouple wires 40 extend. Once flange 30 is secured to vertical support 84, an intentional twisting motion is imparted to thermocouple wires 40, backbone rods 64, and guide plates 86 either by hand or by machine.

First sensing tip 58A, second sensing tip 58B, and second guide plate 66B are twisted or offset at angle A with respect to midline ML. In some embodiments, angle A is equal to about 6-18 degrees. In the depicted embodiment, angle A is offset laterally about 12 degrees from midline ML or a vertical center. Third sensing tip 62A, fourth sensing tip 62B, and fourth guide plate 66D are twisted or offset at angle B with respect to midline ML. In some embodiments, angle B is equal to about 18-30 degrees. In the depicted embodiment, angle B is offset laterally about 24 degrees from midline ML or a vertical center. Accordingly, in some embodiments, angle B is equal to or greater than angle A by an amount of about 0-24 degrees. In the depicted embodiment, angle B is twice angle A, such that angle B is offset from angle A. Intentional twisting causes probe 28 to be wound-up, spring-loaded, or preloaded prior to insertion into housing 30. Probe 28 then partially untwists after insertion into housing 30. The twist in probe 28 also adds damping as discussed above with reference to FIG. 4.

Thus, in the depicted embodiment, probe 28 can have an initial configuration, without any external forces twisting or otherwise bending probe 28, whereby fourth guide plate 66D is positioned at angle A of about 12 degrees and second guide plate 66B is positioned at angle B of about 24 degrees. Probe 28 can then be twisted by external forces such that angle A and angle B are decreased. For example, probe 28 can be twisted such that second guide plate 66B and fourth guide plate 66D are substantially aligned at or near a common angle. Probe 28 can then be inserted into housing 30 while the external forces that twisted probe 28 are removed. The spring-like force of probe 28 then causes probe 28 to be partially untwisted such that second and fourth guide plates 66B and 66D contact and exert a force against inner wall 78 of arm 74 of housing 30 (see, for example, first guide plate 66A as illustrated in FIG. 4). In other embodiments, probe 28 can be bent axially along a length of probe 28 instead of twisting. By bending probe 28 axially prior to insertion, the spring-like force of probe 28 can cause probe 28 to unbend after insertion such that second and fourth guide plates 66B and 66D (and/or another part of probe 28) exert a force against inner wall 78. This force can reduce vibration and extend the life and reliability of probe 28.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

DISCUSSION OF POSSIBLE EMBODIMENTS

The following are non-exclusive descriptions of possible embodiments of the present invention.

A temperature probe can include a flange, a support structure, thermocouple wires, and guide plates. The flange can have a midline. The support structure can be attached to the midline and extends away from the flange. The thermocouple wires can extend along the support structure, and terminate in a set of outer sensing tips and a set of inner sensing tips. The guide plates can secure the thermocouple wires to the support structure. The guide plates can be offset laterally from the midline of the flange.

The temperature probe of the preceding paragraph can optionally include, additionally and/or alternatively any, one or more of the following features, configurations and/or additional components:

the guide plates can include first and second guide plates, wherein the outer sensing tips and the first guide plate are offset laterally from the midline of the flange at a first angle, wherein the inner sensing tips and the second guide plate are offset laterally from the midline of the flange at a second angle, and wherein the second angle is greater than the first angle;

the first angle can be between about 6 and 18 degrees;

the second angle can be between about 18 and 30 degrees;

the inner sensing tips and the second guide plate can be offset laterally from the outer sensing tips and the first guide plate; and/or the inner sensing tips and the second guide plate can be offset by about 12 degrees from the outer sensing tips and the first guide plate.

A temperature sensing system can include a housing and a probe. The housing can include a flange and an elongated body extending from the flange. The elongated body can have walls defining a cavity. The probe can include a flange, a support structure extending from the flange, thermocouple wires extending along the support structure, and guide plates securing the thermocouple wires to the support structure. The flange of the housing can be aligned with the flange of the probe such that the support structure, thermocouple wires, and guide plates extend into cavity of the elongated body. At least one of the guide plates can contact at least one of the walls to damp the probe.

The temperature sensing system of the preceding paragraph can optionally include, additionally and/or alternatively any, one or more of the following features, configurations and/or additional components:

the thermocouple wires can terminate in inner sensing tips and outer sensing tips, wherein the inner sensing tips and the outer sensing tips are aligned with a first opening and a second opening in the housing, respectively;

the outer sensing tips can be located along the support structure at a location between the inner sensing tips and the probe flange;

the guide plates can include first and second guide plates, and the outer sensing tips and the first guide plate can be oriented at a first angle relative to the probe flange;

the inner sensing tips and the second guide plate can be oriented at a second angle relative to the probe flange;

the second angle can be greater than the first angle;

cross sections of the guide plates and the housing can be ovular; and/or a power turbine inlet case can have a hole, the housing flange can be secured to the power turbine inlet case, and the elongated body of the housing can extend through the hole into a hot gas path.

A method can include bending temperature sensing wires, support structure, and guide plates relative to a mounting flange to form a spring-loaded probe, and inserting the spring-loaded probe into a housing such that the probe is mechanically damped by contact with the housing.

The method of the preceding paragraph can optionally include, additionally and/or alternatively any, one or more of the following features, configurations and/or additional steps:

the flange can be secured to a stationary vertical support prior to bending the temperature sensing wires, support structure, and guide plates;

bending can include twisting the temperature sensing wires and guide plates about the support structure, wherein inserting the spring-loaded probe into the housing can include partially un-twisting the temperature sensing wires, support structure, and guide plates relative to the flange;

inserting the spring-loaded probe into the housing can include contacting the housing with at least one of the guide plates;

the housing can be fastened to a gas turbine engine; and a temperature of gas flowing through the gas turbine engine can be sensed with the spring-loaded probe; and/or mounting the housing to a gas turbine engine can include fastening the housing to a power turbine inlet case.

The invention claimed is:

1. A temperature probe comprising:
   a flange having a midline;
   a support structure attached to the midline and extending away from the flange;
   thermocouple wires extending along the support structure, wherein the thermocouple wires terminate in a set of outer sensing tips and a set of inner sensing tips; and
   a first guide plate securing the thermocouple wires to the support structure, wherein the first guide plate is offset laterally from the midline of the flange by a first angle between about 6 degrees and about 18 degrees.

2. The temperature probe of claim 1, further comprising a second guide plate securing the thermocouple wires to the support structure, wherein the second guide plate is offset laterally from the midline of the flange at a second angle, wherein the second angle is greater than the first angle.

3. The temperature probe of claim 2, wherein the second angle is between about 18 and 30 degrees.

4. The temperature probe of claim 2, wherein the inner sensing tips and the second guide plate are offset laterally from the outer sensing tips and the first guide plate.

5. The temperature probe of claim 4, wherein the inner sensing tips and the second guide plate are offset by about 12 degrees from the outer sensing tips and the first guide plate.

6. A temperature sensing system comprising:
   a housing including a housing flange and an elongated body extending from the housing flange, the elongated body having walls defining a cavity; and
   a probe including a probe flange, a support structure extending from the probe flange, thermocouple wires extending along the support structure, and guide plates securing the thermocouple wires to the support structure, wherein the probe flange is aligned with the housing flange, such that the support structure, thermocouple wires, and guide plates extend into the cavity of the elongated body, and at least one of the guide plates contacts at least one of the walls to damp the probe.

7. The temperature sensing system of claim 6, wherein the thermocouple wires terminate in inner sensing tips and outer sensing tips, wherein the inner sensing tips and the outer sensing tips are aligned with a first opening and a second opening in the housing, respectively.

8. The temperature sensing system of claim 6, wherein the outer sensing tips are located along the support structure at a location between the inner sensing tips and the probe flange.

9. The temperature sensing system of claim 8, wherein the guide plates comprise first and second guide plates, and wherein the outer sensing tips and the first guide plate are oriented at a first angle relative to the probe flange.

10. The temperature sensing system of claim 9, wherein the inner sensing tips and the second guide plate are oriented at a second angle relative to the probe flange.

11. The temperature sensing system of claim 10, wherein the second angle is greater than the first angle.

12. The temperature sensing system of claim 6, wherein cross sections of the guide plates and the housing are ovular.

13. The temperature sensing system of claim 6, further comprising:
   a power turbine inlet case having a hole, wherein the housing flange is secured to the power turbine inlet case and the elongated body of the housing extends through the hole into a hot gas path.

14. A method of damping a probe comprising:
   attaching a support structure to a flange such that the support structure extends away from the flange;
   securing temperature sensing wires along the support structure using at least one guide plate;
   twisting at least one of the temperature sensing wires, the support structure, and the at least one guide plate relative to the flange to form a spring-loaded probe; and
   inserting the spring-loaded probe into a housing such that the probe is mechanically damped by contact with the housing.

15. The method of claim 14, further comprising:
   securing the flange to a stationary vertical support prior to twisting at least one of the temperature sensing wires, the support structure, and the at least one guide plate.

16. The method of claim 14, wherein twisting at least one of the temperature sensing wires, the support structure, and the at least one guide plate relative to the flange comprises twisting the temperature sensing wires and guide plates about the support structure, and wherein inserting the spring-loaded probe into the housing includes partially un-twisting the temperature sensing wires, support structure, and guide plates relative to the flange.

17. The method of claim 14, wherein inserting the spring-loaded probe into the housing includes contacting the housing with at least one of the guide plates.

18. The method of claim 14, further comprising:
mounting the housing to a gas turbine engine; and
sensing a temperature of gas flowing through the gas turbine engine with the spring-loaded probe.

19. The method of claim 18, wherein mounting the housing to a gas turbine engine includes fastening the housing to a power turbine inlet case.

* * * * *